United States Patent
Mathieu (10) Patent No.: US 9,200,712 B2
(45) Date of Patent: Dec. 1, 2015

(54) VALVE INCLUDING A DEVICE FOR IMMOBILIZING A JOURNAL, ENERGY CONVERSION INSTALLATION/FLUID DISTRIBUTION NETWORK INCLUDING SUCH A VALVE AND METHOD OF DEMOUNTING SUCH A VALVE

(71) Applicant: ALSTOM Renewable Technologies, Grenoble (FR)

(72) Inventor: Alain Mathieu, Saint Nizier du Moucherotte (FR)

(73) Assignee: ALSTOM Technology Ltd, Baden (CH)

( * ) Notice: Subject to any disclaimer, the term of this patent is extended or adjusted under 35 U.S.C. 154(b) by 171 days.

(21) Appl. No.: 14/149,866

(22) Filed: Jan. 8, 2014

(65) Prior Publication Data

US 2014/0190575 A1    Jul. 10, 2014

(30) Foreign Application Priority Data

Jan. 8, 2013   (FR) ..................... 13 50143

(51) Int. Cl.
| | |
|---|---|
| *F16K 5/08* | (2006.01) |
| *F16K 37/00* | (2006.01) |
| *F16K 5/06* | (2006.01) |
| *F16K 43/00* | (2006.01) |

(52) U.S. Cl.
CPC ................. *F16K 5/08* (2013.01); *F16K 5/0647* (2013.01); *F16K 5/0663* (2013.01); *F16K 37/00* (2013.01); *F16K 43/00* (2013.01); *Y10T 137/0508* (2015.04); *Y10T 137/8158* (2015.04)

(58) Field of Classification Search
CPC ....... F16K 5/08; F16K 5/0663; F16K 5/0647; F16K 43/00; F16K 37/00; F16K 41/02; F16K 41/04; F16K 5/0668; F16K 5/0689; F16K 1/20

USPC .......................................... 137/316
See application file for complete search history.

(56) References Cited

U.S. PATENT DOCUMENTS

| 4,262,691 A | 4/1981 | Kacal |
| 6,076,259 A | 6/2000 | Moss et al. |
| 2003/0178596 A1* | 9/2003 | Gomi et al. ............ 251/305 |
| 2008/0047616 A1* | 2/2008 | Lovell et al. .......... 137/315.28 |
| 2012/0080629 A1* | 4/2012 | Rogge et al. ............ 251/304 |

FOREIGN PATENT DOCUMENTS

| DE | 2908177 A1 | 9/1980 |
| GB | 910640 | 11/1962 |
| SU | 1672067 A1 | 8/1981 |

* cited by examiner

*Primary Examiner* — Craig Schneider
*Assistant Examiner* — Kevin Barss (57) ABSTRACT

This valve is integrated into a fluid distribution network and enables selective interruption or authorization of the circulation of a fluid. The valve includes a fluid blocking member driven in rotation by an actuator device of the valve and at least one journal, a hollow body inside which the blocking member is mobile and which defines at least one bore for receiving the journal, and a bearing disposed around each journal and inside the bore of the body enabling support of the journal and guidance thereof in rotation relative to the bore, thereby centering the journal. The valve further includes a device for immobilizing and sealing for maintenance the journal relative to the body of the valve. This immobilization device is disposed on the same side of the bearing as the internal volume of the hollow body and is maneuverable via the bearing to go from a non-clamped first configuration to a clamped second configuration in which it immobilizes the journal in the bore and vice versa.

19 Claims, 6 Drawing Sheets

VALVE INCLUDING A DEVICE FOR IMMOBILIZING A JOURNAL, ENERGY CONVERSION INSTALLATION/FLUID DISTRIBUTION NETWORK INCLUDING SUCH A VALVE AND METHOD OF DEMOUNTING SUCH A VALVE

CROSS-REFERENCE TO RELATED APPLICATIONS

This application claims priority to French application 1350143 filed Jan. 8, 2013, the contents of which are hereby incorporated in its entirety.

TECHNICAL FIELD

The present invention concerns a valve integrated, in a configuration of use, into a fluid distribution network, notably on the upstream side of a hydraulic machine, and enabling, in controlled manner, interruption or authorization of the flow of a fluid in a pipe. By hydraulic machine is meant a turbine, a pump or a turbine-pump. Such a valve includes a member known as the obturator for blocking the fluid that is driven in rotation by an actuator device of the valve alternately to block or to authorize the passage of the fluid. The valves may be of the spherical type, in which the blocking member, referred to as the obturator, has the shape of a sphere, or of the butterfly type, in which the obturator is a simple disk. The obturator is connected to the actuator device of the valve by journals, enabling transmission of the rotation movement. The journals are therefore situated inside a receiving bore located in the body of the valve. Moreover, a smooth bearing is used to support, guide and center each journal in rotation relative to the bore in the body of the valve.

BACKGROUND

Moreover, it is known that a hydraulic installation may include a plurality of hydraulic machines all fed in parallel by a pipe on the upstream side. Accordingly, during maintenance operations on a valve, it is necessary to work on the valve dry, i.e. without fluid inside it. This has the disadvantage that the arrival of fluid on the upstream side of the valve, in the pipe, must be shut off and therefore feeding of the other hydraulic machines of the installation must be stopped. This drawback is moreover exactly the same for valves installed on other fluid distribution networks. This is economically disadvantageous because the production or the distribution of fluid is stopped during maintenance operations on the valve. The smooth bearing, disposed around the journal, is subjected to friction forces by the journal that are generated by the force of the water on the obturator and by the weights. It is therefore necessary to repair it or to replace it several times over the service life of the hydraulic installation. The same problem arises for valves used in other fluid distribution networks.

EP-A-0 834 032 describes a valve designed so that, during maintenance operations, it is possible to access some components supporting the journal such as the smooth bearing. The above document describes a valve in which it is possible to replace the bearing parts without evacuating all of the water on the upstream side. To this end, the valve described uses upstream and downstream sealing rings, these rings providing the seal between the obturator and the body of the valve. These sealing rings are movable axially in the direction of flow of the fluid inside the valve by pressurizing the space between the body of the valve and the blocking member, which pushes the sealing rings into contact both with the blocking member and with the body of the valve. This technology is applicable only if the blocking member is a ball, i.e. only for a valve of spherical type. Moreover, in the method described in this document, in order to remove the parts supporting the journal and the journal itself, it is obligatory to demount the downstream sealing ring in order to install a cover on the downstream side of the valve, as this makes it possible to balance the pressure of the fluid on the upstream and downstream sides of the valve and therefore to prevent the journal or the parts supporting the journal being subjected to the thrust force on the obturator caused by the pressure of the fluid. The problem with this device is that if the upstream sealing ring is not tight enough, i.e. if the pressurization of this ring is not sufficient, fluid invades the interior of the body and maintenance operations are impossible. Moreover, dismantling the parts supporting the journal and/or the journal necessitates decompression of the space between the body of the valve and the obturator, which can lead to the upstream sealing ring moving and causing a leak. Moreover, this valve does not include any mechanical device enabling the journal to be kept perfectly centered in the bore. This can lead to the journal being off-center and therefore a fortiori the obturator being off-center and can therefore cause leaks placing personnel in danger during the maintenance operation.

It is these drawbacks that the invention is more particularly intended to remedy by proposing a system integrated into the valve whereby maintenance operations on the bearing are facilitated, more reliable, and applicable to any type of obturator.

SUMMARY

To this end, the invention concerns a valve integrated into a fluid distribution network and enabling selective interruption or authorization of the circulation of a fluid in a feed pipe, this valve including:
- a fluid blocking member driven in rotation by an actuator device of the valve alternately to block or to authorize the passage of the fluid and which includes at least one journal,
- a hollow body inside which the blocking member is mobile and which defines at least one bore for receiving the journal,
- a bearing disposed around the journal and inside the bore of the body to support the journal and guide its rotation relative to the bore, thereby centering the journal.

This valve is characterized in that it further includes a device for immobilizing the journal relative to the body of the valve, this immobilization device being on the same side of the bearing as the internal volume of the hollow body and being movable via a lining that is part of the bearing to go from a non-clamped first configuration in which it does not oppose the rotation of the journal in the bore to a clamped second configuration in which it immobilizes the journal in the bore and to go from the second configuration to the first configuration.

Thanks to the invention, it is possible to remove the bearing disposed between the journal and the body of the valve in any type of valve without having to demount supporting parts on the downstream side of the valve and without having to recenter the journal after replacing the bearing.

According to advantageous but not obligatory aspects of the invention, a valve may incorporate one or more of the following features in any technically permissible combination:

The immobilization device includes at least one elastically deformable sleeve and a ring controlling the elastic deformable of the sleeve, the sleeve and the ring being disposed around the journal and inside the bore, while the ring includes a cam surface adapted to exert on the sleeve a deformation force that locks the sleeve against an element defining the bore or against the journal in the second configuration of the immobilization device.

The cam surface of the ring is frustoconical and the surface of the sleeve radially facing the ring is frustoconical and inclined in a manner complementary to the frustoconical surface of the ring.

The immobilization device includes two elastically deformable sleeves respectively disposed radially inside and outside the actuator ring.

The actuator ring is movable axially along an axis parallel to the rotation axis of the journal and pushes each sleeve radially against the element defining the bore and against the journal, respectively, when the immobilization device goes from its first configuration to its second configuration.

The actuator ring is moved by means of a plurality of screw-nut systems, the ring including screwthreads for receiving threaded members rotation of which is commanded via the lining, the screwthreads and the threaded members being distributed around the rotation axis of the journal.

The valve further includes a sealing mechanism including a seal-support disposed on the same side of the actuator ring and the sleeves as the internal volume of the hollow body and that supports a seal and in that the seal-support is movable axially along an axis parallel to the rotation axis of the journal from an open first position in which the fluid can flow inside the immobilization device to a closed second position in which the seal abuts against the shoulder of the journal, sealing the immobilization device, and, conversely, the seal-support is movable from the second position to the first.

The seal-support is moved by means of a plurality of clamping screws that are axially fastened to the seal-support.

The valve includes at least one indicator disposed externally of the valve and enabling indication of the immobilization device being in its first configuration.

The body of the valve is equipped with passages and at least one needle valve enabling balancing of the pressure of the fluid on either side of the immobilization device.

In the first configuration of the immobilization device, a radial clearance between the or each extensible sleeve and the journal or the element defining the bore, respectively, is strictly greater than the radial clearance of the bearing and is less than one millimeter.

The immobilization device is maneuverable to go from its first configuration to its second configuration and vice versa by at least one maneuvering member that passes axially through a lining that is part of the bearing. This maneuvering member may be permanently mounted on the valve. Alternatively, the maneuvering member is a rod that is inserted when necessary into an axial bore in a lining of the bearing secured to the bore.

The invention also concerns a fluid distribution network including at least one valve as described above installed on a pipe.

The invention further concerns an installation for converting hydraulic energy into electrical or mechanical energy or vice versa characterized in that it includes a fluid distribution network as described above in which the pipe is a pipe feeding a hydraulic machine that is part of the installation.

The invention finally concerns a method for partial dismounting of a valve as described above, this method including the steps of:
a)—placing a blocking member on a downstream part of the hollow body,
b)—balancing the water pressure on either side of the blocking member,
characterized in that this method further includes the steps of:
c)—maneuvering the immobilization device so that it goes from its first configuration to its second configuration,
d)—removing the bearing.

In accordance with advantageous but not obligatory aspects of the invention, such a method for partial demounting of a valve may incorporate one or more of the following steps:

The valve includes a sealing device as envisaged above and the method further includes a step e) after the step b) and before the step c) consisting in allowing the fluid to flow inside the immobilization device in order to clean it, and then stopping this flow.

The valve includes a sealing device as envisaged above and the method further includes a step f) after the step c) and before the step d) consisting in maneuvering the sealing mechanism so that it goes from its first position to its second position.

BRIEF DESCRIPTION OF THE DRAWINGS

The invention will be better understood and other advantages thereof will become more clearly apparent in the light of the following description of valves in accordance with two embodiments of the invention given by way of example only and with reference with the appended drawings, in which.

DETAILED DESCRIPTION

Figure 1:
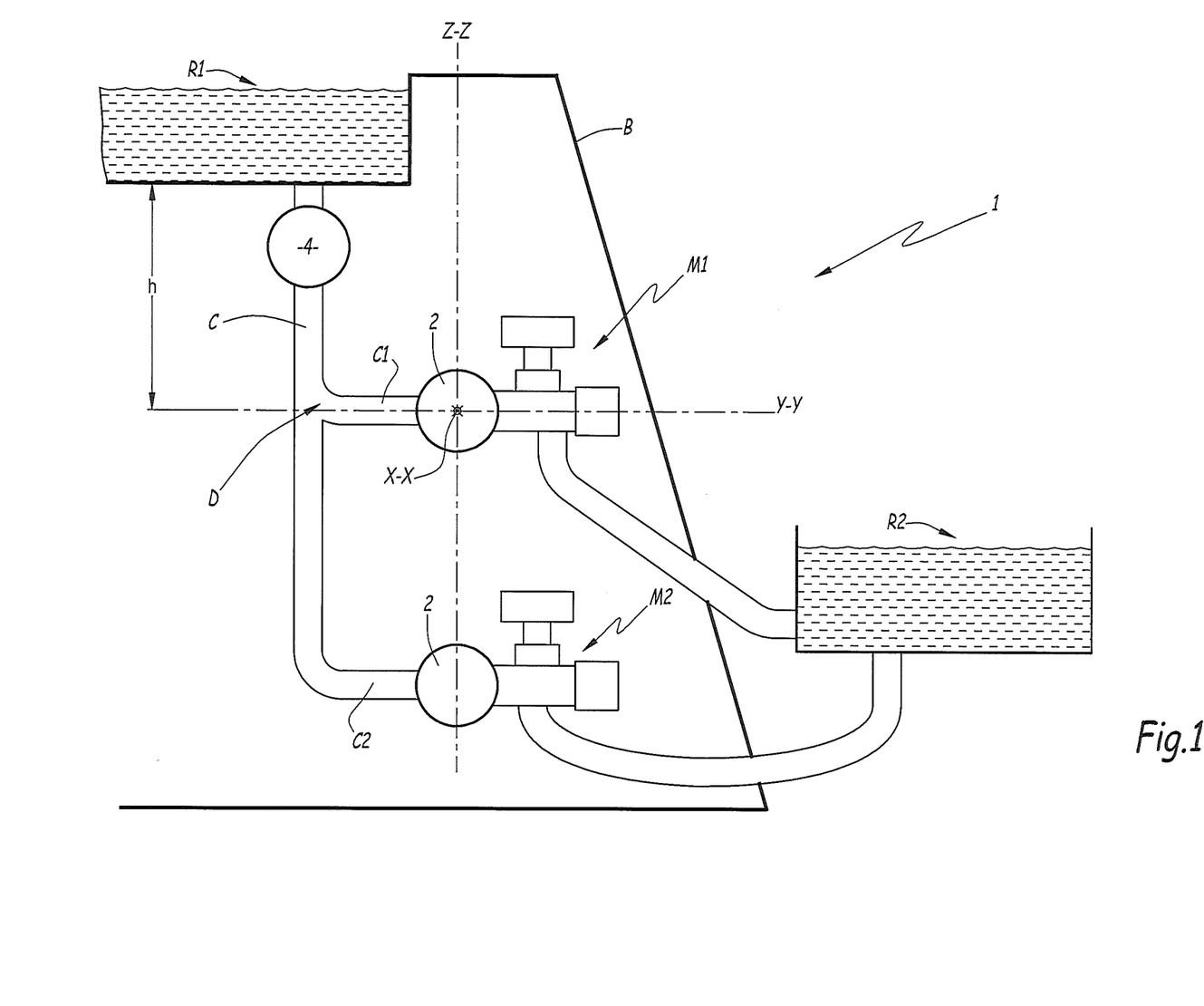
FIG. 1 is a diagrammatic view of a hydraulic installation including valves in accordance with the invention.

In FIG. 1 there is represented an example of an installation 1 according to the invention for converting hydraulic energy into electrical energy, which hydraulic installation 1 includes a dam B, an upstream pond R1, a plurality of hydraulic machines M1 and M2 and a downstream pond R2. Among other things, this type of hydraulic installation provides a simple way of storing electrical energy: each hydraulic machine functions as a turbine during the day, i.e. uses the hydraulic energy resulting from the height difference h between the upstream retainer R1 and the hydraulic machine M1 or M2, for example to rotate an alternator and therefore produce electricity, and to function as a pump at night, thus feeding water contained in the downstream retainer R2 to the upstream retainer R1. To this end, the hydraulic installation further includes a feed pipe C connected to the upstream retainer R1 that enables all the hydraulic machines to be fed in parallel by means of a bifurcation D situated on the upstream side of all the hydraulic machines. Two types of valves are routinely used in this case. A first valve 4 known as the pipe head valve stops or alternatively authorizes flow in the pipe C. A second valve 2 called the guard valve is situated on the downstream side of the bifurcation and on the upstream side of each hydraulic machine. It stops or feeds the hydraulic machine on the downstream side of this valve.

Note a feed pipe C1 of the hydraulic machine M1 and a feed pipe C2 of the hydraulic machine M2. The pipe C and the pipes C1 and C2 together form a fluid distribution network.

The description given hereinafter is therefore more particularly concerned with a guard valve 2 designed to allow or to stop the feeding of the hydraulic machine M1. It may nevertheless be transposed to a pipe head valve to which the invention also applies. All this can also be transposed to a fluid distribution network with no hydraulic machines.

The guard valve 2 is in a pipe C1 directly feeding the hydraulic machine M1 and water therefore passes through it in a direction defined by an axis Y-Y. There are moreover defined an axis Z-Z as the axis perpendicular to the axis Y-Y in the plane of FIG. 1, the axis Z-Z being vertical, and an axis X-X perpendicular to the axes Y-Y and Z-Z and to the plane of FIG. 1. The axes X-X, Y-Y and Z-Z intersect at the center of the valve 2.

Figure 2:
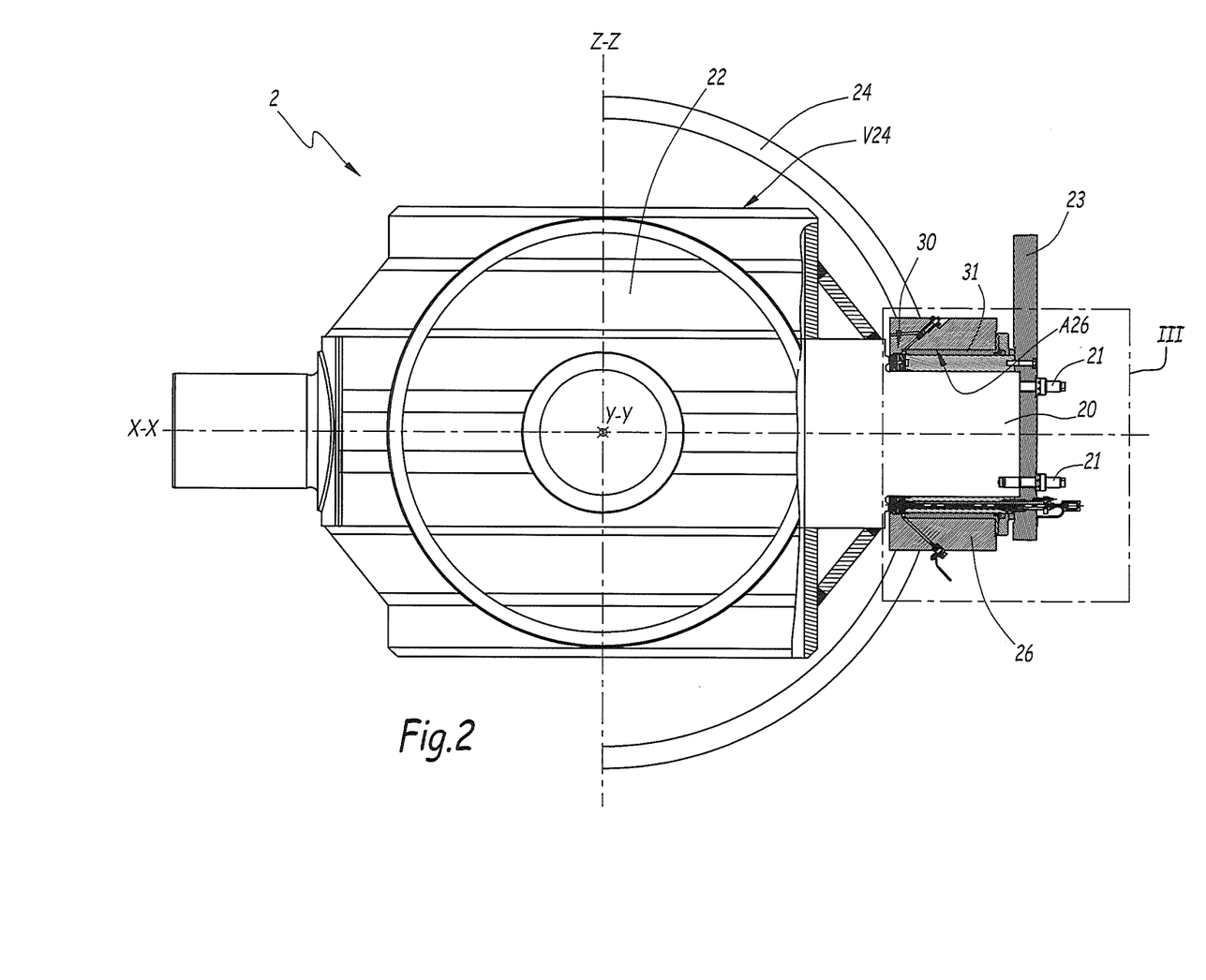
FIG. 2 is a cross section of a valve in accordance with the invention that is part of the FIG. 1 installation.

As emerges from FIG. 2, which is a more detailed representation of the valve 2 seen from the downstream side, the latter valve includes a hollow cylindrical or spherical body 24 centered relative to the axis Y-Y and a blocking member 22 known as the obturator able to turn about the axis X-X through an angle of 90° to allow or interrupt the flow of the fluid toward the hydraulic machine M1. In FIG. 2, only half of the fixed part of the valve 2 is represented, on the right-hand side in that figure. A journal 20, of cylindrical shape and also centered relative to the axis X-X, is fastened by screws 21 to an actuator device which, in the example concerned, is a lever 23 enabling application of a torque about the axis X-X to drive the journal 20 and the blocking member 22 in rotation about the axis X-X and therefore between the passing and blocking positions of the valve.

The valve 2 includes a fixed body 24 that defines an internal volume V24 in which the blocking member 22 is received.

The journal 20 is accommodated in a bore A26 defined inside a cylindrical element 26 with a circular base that is part of the body 24 of the valve 2. The bore A26 and the element 26 are also centered relative to the axis X-X and disposed radially around the journal 20.

The bore A26 includes a shoulder at the forward end of the bearing 31, i.e. on the same side as the internal volume V24 of the body 24. The valve 2 further includes a smooth bearing 31 inserted radially between the journal 20 and the element 26. The bearing 31 is formed of a first facing 32 immobilized against rotation about the journal 20 and a second lining 33 immobilized against rotation in the bore A26, i.e. against the element 26. The first lining 32 is a bearing ring and the second lining 33 is a bearing bush. The lining 33 surrounds a lining 32 and sliding occurs at the interface between the surfaces in contact of these linings.

This bearing 31, on the one hand, keeps the journal 20 centered relative to the axis X-X and, on the other hand, guides rotation of the journal 20 about the axis X-X. It is therefore clear that the component parts 32 and 33 of the bearing 31 have a low coefficient of mutual friction, which enables the blocking member 22 to be maneuvered easily and damage linked to friction to be prevented. The fact of maintaining the journal 20 precisely centered relative to the axis X-X is important because, if the blocking member 22, fastened to the journal 20, is off-center, leaks occur because the blocking member 22 no longer blocks the pipe completely. It is therefore clear that the function of the bearing 31 is of primordial importance, which is why it is important to verify that the linings 32 and 33 of the bearing 31 have not been damaged several times during the service life of the hydraulic machine, and if necessary to replace them.

Now, if one of the linings of the bearing 31 were removed without taking precautions, the journal 20 would then no longer be immobilized and it would therefore be impossible to recenter it relative to the axis X-X.

Figure 3:
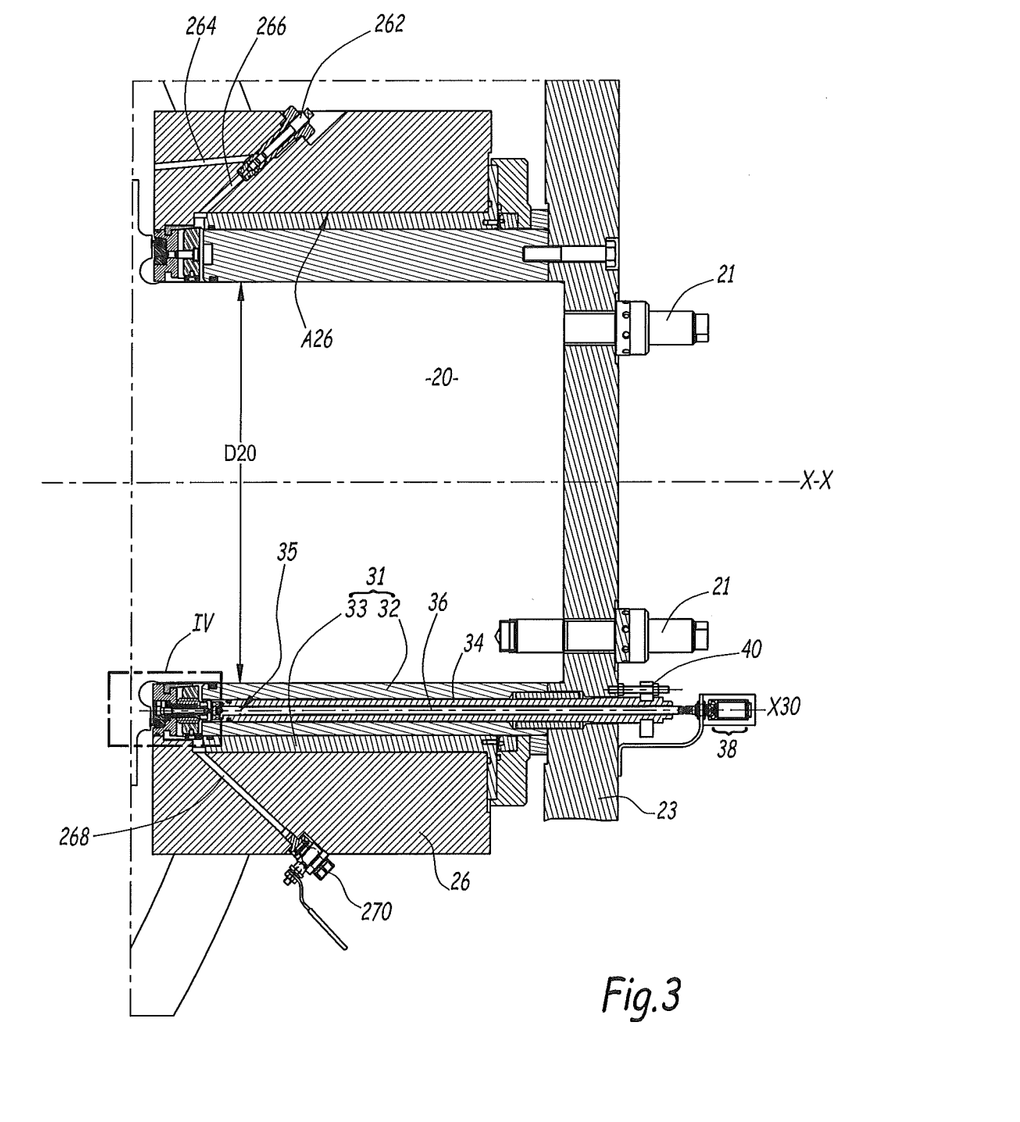
FIG. 3 is a view to a larger scale of the detail III from FIG. 2.

The valve 2 therefore includes an immobilization device 30 of globally annular shape, centered relative to the axis X-X, shown better in FIG. 3, and disposed radially between the journal 20 and the bore 26. The immobilization device 30 consists of a plurality of mechanical parts and is on the same side of the bearing 31 as the internal volume V24 of the body 24, i.e. inside or at the front of the bore A26.

Externally of the immobilization device 30, and to the rear thereof, i.e. on the side opposite the internal volume V24, there are disposed maneuvering members 34 and 36. Conversely, the immobilization device 30 is at the front of the maneuvering members 34 and 36, i.e. on the same side of them as the volume V24. These maneuvering members 34 and 36 are rods which in this embodiment are permanently mounted on the valve 2. In the remainder of the description one part is therefore considered in front of another if it is on the same side of it as the internal volume V24 of the body 24.

At the rear of the rods 34 and 36 there is an indicator 38 for indicating if the journal is immobilized or not. In fact, if the maneuvering rods 34 and 36 are not fully retracted, attempting to open the obturator is prohibited because this would risk damaging the immobilization device.

The first smooth lining 32 also known as the ring includes a plurality of through-bores 35 each centered on an axis X30 parallel to the axis X-X. The second lining 33 also known as the bush is therefore between the lining 32 and the bore A26.

In order to center the journal 20 relative to the axis X-X as accurately as possible, the forces with which the immobilization device 30 presses on the journal 20 are distributed uniformly around the axis X-X by using a plurality of bores 35. Here sixteen bores 35 in the lining 32 are distributed around the axis X-X in order to render the immobilization uniform.

Figure 4:
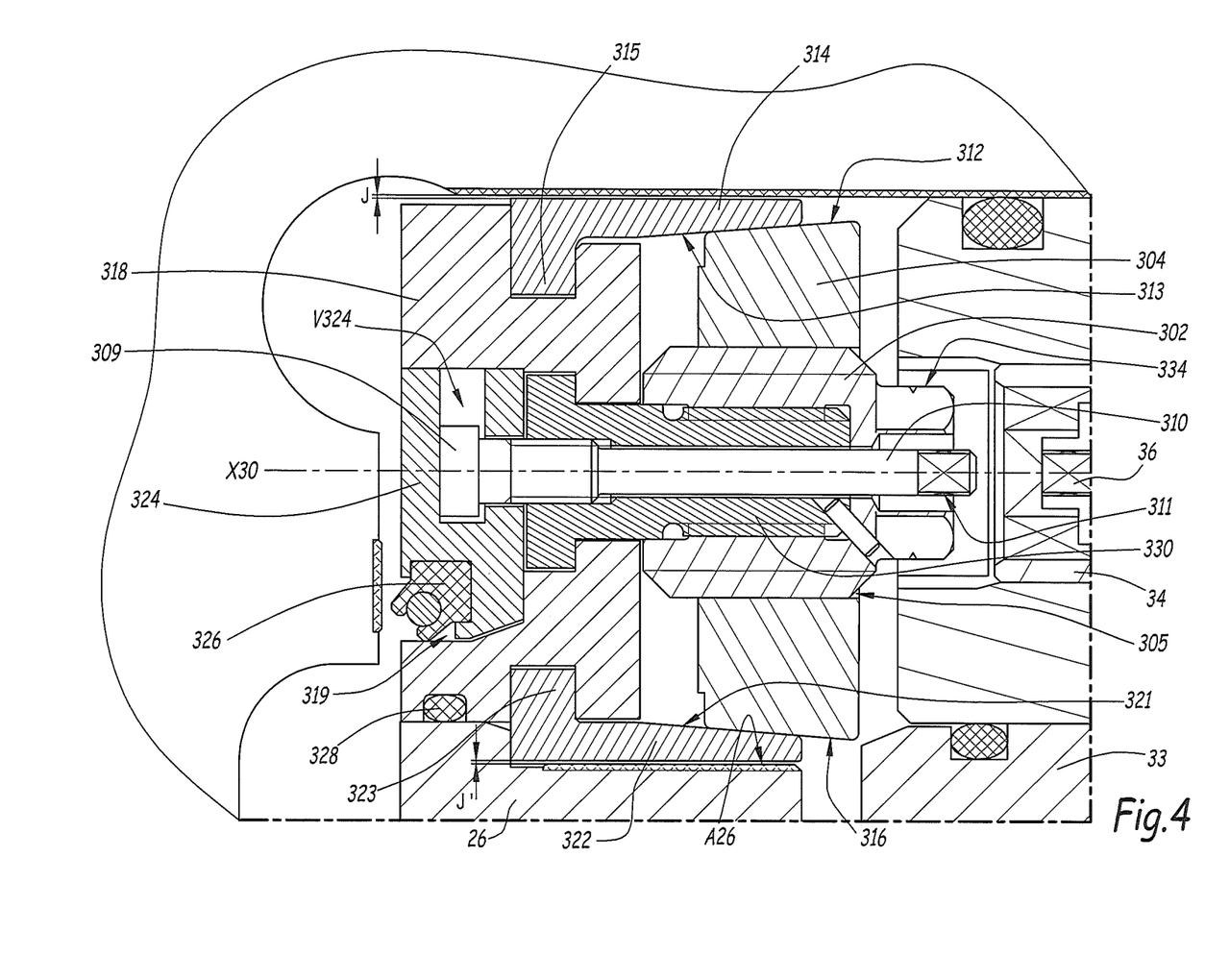
FIG. 4 is a view to a larger scale of the detail IV from FIG. 3 when the valve is in a first configuration.
Figure 5:
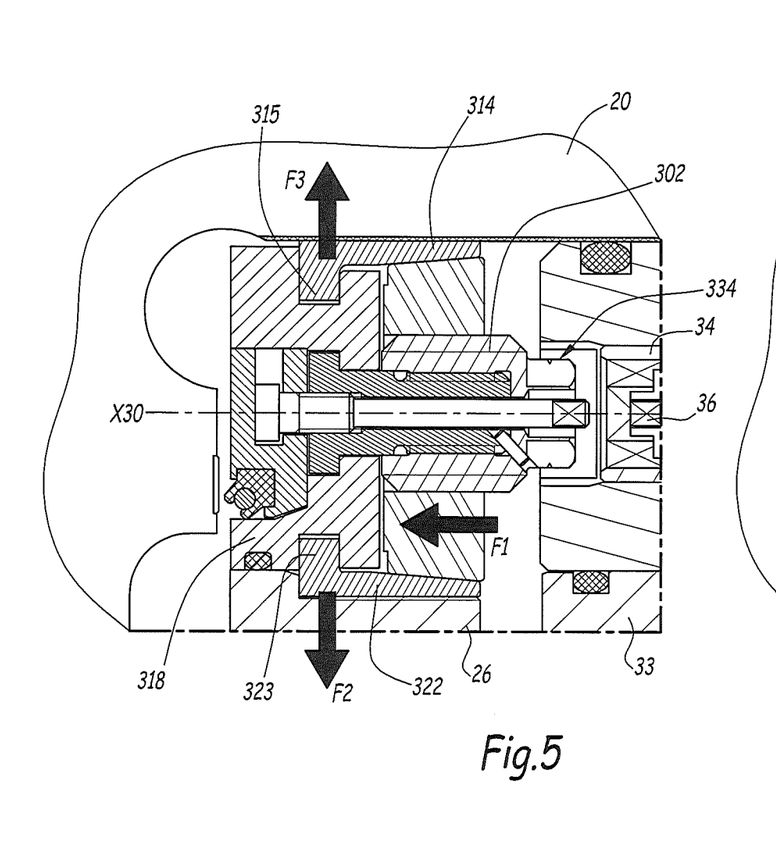
FIGS. 5 and 6 are detail views analogous to FIG. 4 but to a smaller scale when the valve is in other configurations during demounting.
Figure 6:
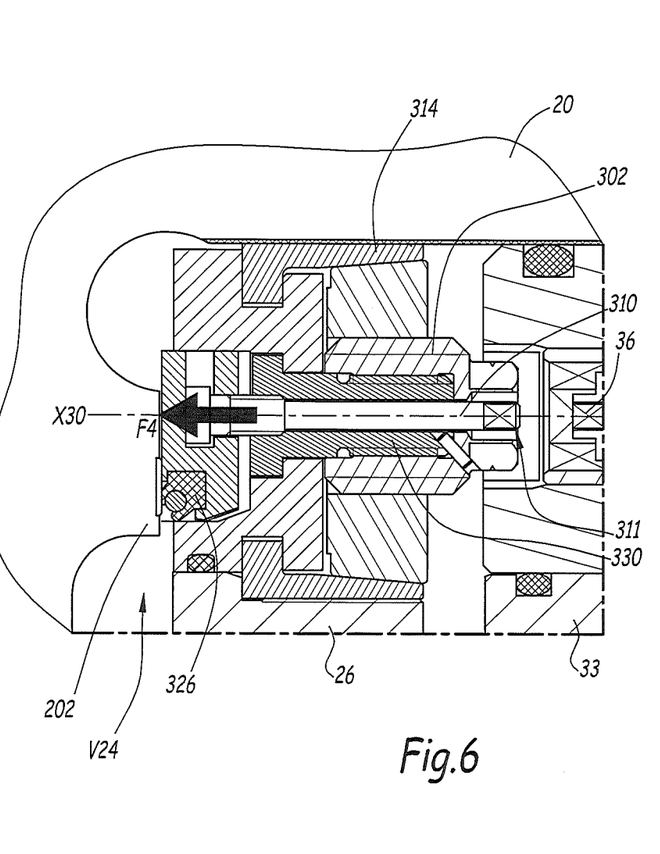

In order for the operation of the immobilization device 30 to be clearly understood the latter device is represented in three different configurations in FIGS. 4, 5 and 6.

In FIG. 4 the immobilization device 30 is represented in a first, so-called relaxed configuration in that it does not exert any radial pressure on the journal 20 or on the bore in the body 26. The immobilization device 30 includes a actuator ring 304 disposed radially around the journal 20 and inside the bore A26, centered relative to the axis X-X, which includes sixteen screwthreads 305 axially aligned with the bores 35 in the lining 32, i.e. each centered relative to the axis X30.

The actuator ring 304 has an external radial surface 316 and an interior radial surface 312. With respect to the axis X-X, the exterior surface 316 converges toward the front and the interior surface 312 diverges toward the front, which gives each of them a frustoconical shape. This actuator ring 304 bears radially on elastically deformable sleeves 314 and 322. Each of the elastically deformable sleeves 314 and 322 has the overall shape of a split ring, centered relative to the axis X-X, and radially disposed in the bore A26, respectively inside and outside the actuator ring 304. Moreover, the fact of using split sleeves 314 and 322 enables them to be made more elastic. These sleeves 314 and 322 are part of the device 30 and have respective interior radial surfaces 313 and 321 of complementary shape to the surfaces 312 and 316 of the actuator ring 304.

The sleeve 314 further includes an indexing flange 315 situated externally and at the front, i.e. on the same side as the internal volume V24. The sleeve 322 also includes an indexing flange 323, situated internally and also at the front. The flanges 315 and 323 may be continuous or interrupted over the circumference of the sleeves 314 and 322.

These indexing flanges are engaged radially in grooves of corresponding shape provided in a ring 318 that is also part of the device 30 and is disposed at the front relative to the actuator ring 304 and is also of globally annular shape centered relative to the axis X-X. It follows from this that the indexing flanges enable axial fastening together of the ring 318 and the sleeves 314 and 322.

The sleeves 314 and 322 are therefore also immobilized axially, thanks to the flanges 315 and 323. The ring 318 is axially immobilized in the bore A26 in one direction by bearing on the flange 323 and in the other direction by bearing on the bearing bush 33.

On movement of the actuator ring 304 toward the left in FIGS. 4 to 6, the surfaces 312 and 316 slide on the surfaces 313 and 321, respectively, while the sleeves 314 and 322 are stopped axially by the flanges 315 and 323 in the rings 318. Accordingly, movement in translation of the ring 304, toward the left in FIGS. 4 to 6, i.e. toward the volume V24, is converted into a radial movement of the ends of the sleeves 314 and 322 facing the flanges 315 and 323. The surfaces 312, 313, 316 and 321 are therefore cam and sliding surfaces for the immobilization device 30.

The immobilization device 30 uses two elastically deformable sleeves 314 and 322. In a variant that is not shown the immobilization device 30 can also function with only one sleeve 314 or 322, this sleeve bearing externally on the bore A26 or on the journal 20.

Inside each screwthread 305 of the actuator ring 304 there are disposed a nut 302, a clamping screw 310 and a bolt 330 all centered relative to the axis X30 and forming part of the device 30. The screw 310 is received in the bolt 330 which is itself received in a central screwthread of the nut 302. The nut 302 includes a front portion threaded externally with a thread pitch complementary to that of the screwthread 305 of the actuator ring 304 and a rear portion with a polygonal external surface 334 functioning like the functional surfaces of a nut. The nut 302 is disposed inside the immobilization device 30 at the rear, axially facing each clamping key 34. Inside this nut 302 and the bolt 330 there is positioned the screw 310 that extends longitudinally along the axis X30 and includes an external screwthread, a screwhead 311, situated at the rear of the screw 310, i.e. oriented axially facing each rod 36, and a shoulder 309 situated at the front of the screw 310. At its front end the clamping screw 310 bears along the axis X30 on a seal-support 324 that is centered relative to the axis X-X, disposed in an annular housing 319 of the ring 318 and supports a seal 326. This seal-support 324 further defines a volume V324 for receiving the front end or shoulder 309 of the screw 310. The bolt 330 lies axially between the screw 310 and the nut 302 and includes an internal screwthread complementary to the screwthread of the screw 310. Moreover, a seal 328 is disposed radially between the ring 318 and the bore A26.

In this configuration, the radial clearance J between the elastic sleeve 314 and the journal 20 is less than 1 mm for a journal 20 of diameter D20 equal to 1000 mm. Similarly, the radial clearance J' between the sleeve 322 and the bore A26 is less than 1 mm for the same value of the diameter. The clearances J and J' are greater than the radial clearance of the bearing 31, i.e. the existing clearance between 0.2 and 1 mm. The clearances J and J' must be identical to enable uniform forward movement of the ring 304. In practice, the radial clearances J and J' depend on the dimensions of the valve. They are defined so that the sleeves 314 and 322 do not impede the rotation of the journal when the immobilization device 30 is released.

All the components described above, apart from the seals, are made of stainless steel, to prevent corrosion. The seals used are O-rings or lip seals and are made from a nitrile or polyurethane type elastomer material. Moreover, although in this embodiment sixteen clamping screws 310, sixteen bolts 330 and sixteen nuts 302 are used, the number of screws, bolts and nuts used for immobilization is adapted as a function of the diameter of the pipes and the pressure of the fluid inside. Similarly, the number of bores 35 and of screwthreads 305 is also adaptable and may be different from 16.

Manipulating the clamping rod 34 enables the immobilization device to be brought into a second configuration represented in FIG. 5.

The journal 20 is immobilized relative to the bore A26 by the clamping rod 34 which is placed around the functional surfaces 334 of the nut 302 thanks to the tightening of the three nuts 40 and is turned about the axis X30, therefore driving rotation of the nut 302 about the axis X30. The exterior screwthread of the nut 302 cooperates with the screwthread 305 of the actuator ring 304 in order to drive the actuator ring 304 in translation in a direction F1 parallel to the axis X30. The cam surfaces 312 and 316 of the actuator ring 304 that are already in contact with the surfaces 313 and 321 of the sleeves 314 and 322 push these sleeves radially in two radial directions F2 and F3 relative to the axis X30, respectively against the element 26 and against the journal 20. In this configuration the radial clearances J and J' between the sleeves 314 and 322 and the journal 20 and the element 26, respectively, is zero. It is the adhesion caused by the contact pressures between the sleeve 314 and the journal 20 and between the sleeve 322 and the element 26 that fastens together the immobilization device 30, the element 26 and the journal 20.

To summarize, the immobilization device 30 can be maneuvered from a non-clamped first configuration in which it does not oppose rotation of the journal 20 in the bore A26 to a clamped second configuration in which it immobilizes the journal 20 in the bore A26 and conversely from the second configuration to the first. Because the sleeves 322 and 314 are fastened together by the indexing flanges 315 and 323 of the ring 318, axial movement of the sleeves 314 and 322 is blocked. Accordingly, the axial force exerted by the actuator ring 304 is converted completely into a radial force exerted on the sleeves 314 and 322. In this way, when all the nuts 302 distributed around the axis X-X are tightened the journal 20 is held immobilized and centered relative to the axis X-X.

If the operation is effected on a valve with the fluid still present inside the valve 2, it is then necessary to seal the bearing 31 in order to remove it to replace it. The immobilization device 30 therefore further includes a sealing mechanism which, when actuated, brings the immobilization device 30 into the configuration represented in FIG. 6.

In order to go from the configuration represented in FIG. 5 to the configuration of FIG. 6, it is simply necessary to rotate the second rod 36 about the axis X30. In fact, the first rod 34 having been advanced previously, the second rod 36 has moved axially with the first rod 34. The latter is therefore in position around the functional surfaces of the head 311 of the screw 310. This rotation results in a movement in translation of the screw 310 in a direction F4 parallel to the axis X30 because of the complementary nature of the external screwthread of the clamping screw 310 and the internal screwthread of the bolt 330. As it moves in axial translation, the clamping screw 310 drives the seal-support 324 against a shoulder 202 of the journal 20. The seal 326 carried at the front of the seal-support 324 is therefore compressed against the shoulder 202 of the journal 20, thus sealing the actuator device 30.

Conversely, to release the system, i.e. to go from the FIG. 6 configuration to that of FIG. 4, it is necessary to turn the rod 36 in the direction opposite that described above, in order to move the clamping screw 310 in axial translation toward the rear. In practice, this movement is accompanied by the pressure of the water exerted on the front, which tends to retract the rod 36. As it moves in translation, the clamping screw 310 drives rearward axial movement of the seal-support 324 by virtue of the contact between the receiving volume V324 in the seal-support 324 and the shoulder 309 of the screw 310. The seal 326 is therefore no longer in contact with the shoulder 202 of the journal 20. It is then necessary to turn the clamping rod 34 in the opposite direction in order to move the actuator ring 304 in axial translation toward the rear. This enables releasing of the pressure exerted radially by the actuator ring 304 of the sleeves 314 and 322. By virtue of their elasticity, the split sleeves 314 and 322 resume the initial radial clearances J and J'.

A method is explained hereinafter for removing the bearing 31 from the valve 2. Firstly, before any other operation, it is essential to unfasten the downstream pipe from the valve 2 and to install a cover or in this particular situation a convex dome on the downstream side of the valve 2 and then to balance the upstream pressure and the downstream pressure by injecting fluid into the space between the blocking member and the cover. This operation is not shown in the figures because it is known in itself. This has the advantage that the blocking member 22 and therefore a fortiori the journal 20 do not have to be subjected to the fluid pressure force. The bearing 31 therefore supports only the weight of the blocking member 22. If the fluid passing through the valve 2 is impure, i.e. contains mud or sand, it is then beneficial to be able to purge the impurities inside the immobilization device 30. This prevents long-term damage to the immobilization device 30. To be more precise, the fluid flows from the internal volume V24 of the valve 2 through a first passage 264 and then a second passage 266 inside the immobilization device 30. The passages 264 and 266 are formed in the element 26. A first needle valve 262 is used that enables opening or closing of communication between the passages 264 and 266, i.e. selective opening of communication between the internal volume V24 and the device 30. The water injected into the immobilization device 30 when the needle valve 262 is open is then evacuated by means of a drain passage 268 also situated in the body of the element 26. Evacuation is effected by opening a second needle valve or small manual valve 270. In practice, the cleaning time to evacuate the residues that have remained inside the immobilization device 30 is evaluated during the maintenance operation. Finally the valve 270 must be closed.

When this operation has been effected, there follows activation of the immobilization device 30. As described above, maneuvering the clamping rod 34 enables the screw/nut system 302/304 to press the two deformable sleeves 314 and 322 against the journal 20 and the element 26, respectively. This is achieved by virtue of elastic deformation of the sleeves 314 and 322. If it is necessary to actuate the sealing mechanism, for example in the case of a butterfly type valve in which fluid would be in contact with the smooth bearing 31, it is necessary to maneuver the rod 36 for the screw/nut system 310/330 to press the seal 326 against the shoulder of the journal 202 and thus seal the bearing 31. When this has been done, injection of the fluid into the interior of the immobilization device 30 via the needle valve 262 can be stopped and the remaining fluid purged via the drain passage 268. In the case of a spherical type valve, the sealing mechanism need not be activated in that the fluid that has remained inside the locking member 22 is drained away. After the journal 20 has been immobilized, in order to access the bearing 31 it is necessary to remove the rods 34 and 36, after first removing the nuts 40 and the locking indicator 38, and then to dismantle the lever 23 by undoing the screws 21. Finally, if no leak is seen, the bearing 31 may be freely removed from the valve 2. Note that none of the steps leading to the removal of the bearing 31 necessitate the input of external energy, for example by compressed air or by a hydraulic power system, and can be carried out using simple tools such as a pipe torque wrench.

Conversely, when fitting a new bearing 31 inside the valve 2, it is first necessary to position this bearing 31 inside the bore A26, then to reposition the lever 23 by tightening the screws 21 and finally to insert the rods 34 and 36 into the bore 35 again. There follows this the fixing of the rods 34 and 36 by means of the nuts 40 and the replacement of the locking indicator 38. Only in a second stage can the immobilization device 30 be deactivated, in order to prevent the journal 20 being off-center relative to the axis X-X.

Figure 7:
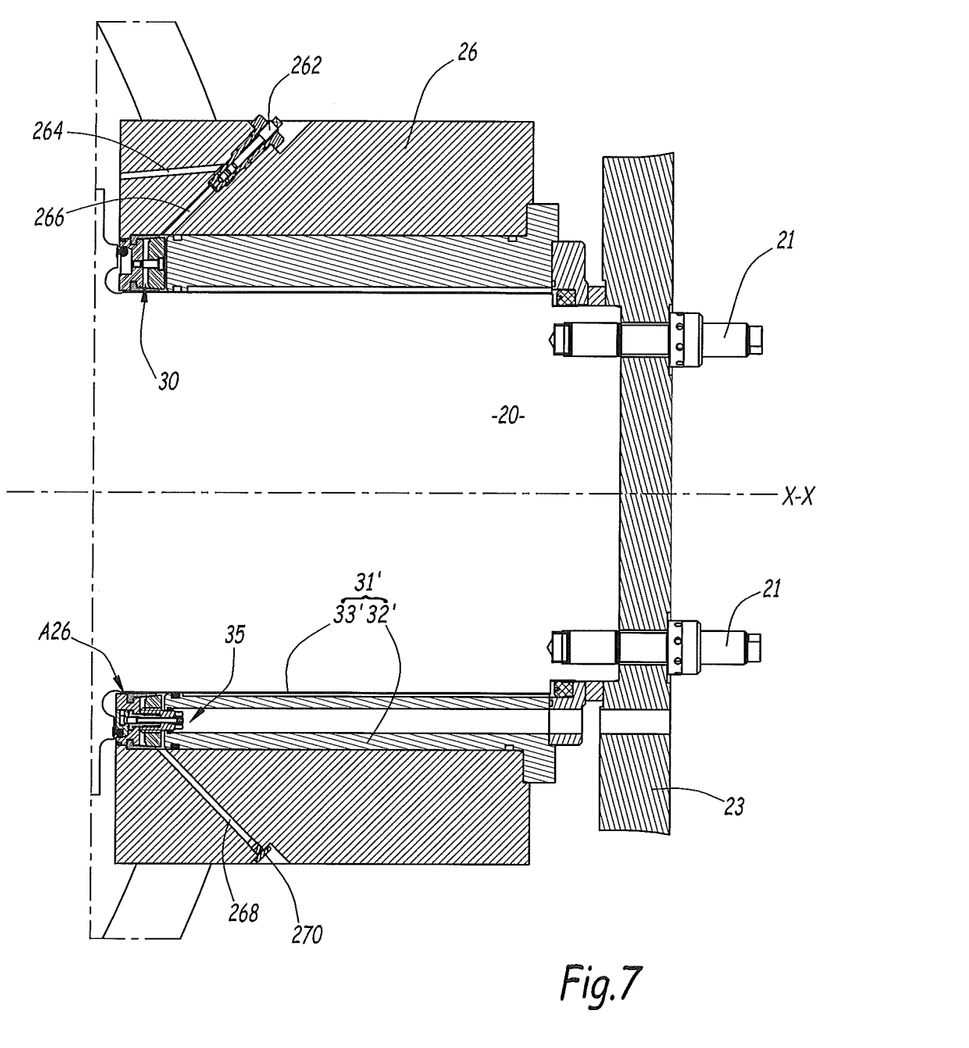
FIG. 7 is a view analogous to FIG. 3 for a valve conforming to a second embodiment.

In FIG. 7 there is represented another embodiment of the valve in which the smooth bearing 31' includes a first lining 33' disposed radially outside the journal 20 and a second lining 32' that is disposed radially outside the first smooth lining 33'. To be more precise, the first lining 33' is a thin self-lubricating ring and the second lining 32' is a thick bush. The particular feature of this configuration is that the clamping keys 34 and 36 are no longer mounted permanently on the valve 2 but are fitted by the operative when necessary. Given that this structural feature does not influence the functioning of the immobilization device 30 specific to the invention, the foregoing description therefore covers either of these two embodiments.

By way of a variant that is not represented, it is possible to insert a key into the split area of the sleeves 314 and 322 to prevent rotation thereof about the axis X-X. Similarly, using a single sleeve 314 or 322 may be envisaged that is pushed back when the actuator ring 304 advances. This solution is less effective than using two sleeves, however.

The invention claimed is:

1. A valve integrated into a fluid distribution network and enabling selective interruption or authorization of the circulation of a fluid in a feed pipe, the valve comprising:
 a fluid blocking member driven in rotation by an actuator device of the valve alternately to block or to authorize the passage of the fluid and which includes at least one journal,
 a hollow body inside which the blocking member is mobile and which defines at least one bore for receiving the journal,
 a bearing disposed around the journal and inside the bore of the body to support the journal and guide its rotation relative to the bore, thereby centering the journal,
 An immobilization device to immobilize the journal relative to the body of the valve, the immobilization device being on the same side of the bearing as the internal volume of the hollow body and being movable via a lining that is part of the bearing to go from a non-clamped first configuration in which it does not oppose the rotation of the journal in the bore to a clamped second configuration in which it immobilizes the journal in the bore and to go from the second configuration to the first configuration.

2. The valve as claimed in claim 1, wherein the immobilization device includes at least one elastically deformable sleeve and a ring controlling the elastic deformable of the sleeve, the sleeve and the ring being disposed around the journal and inside the bore, while the ring includes a cam surface adapted to exert on the sleeve a deformation force that locks the sleeve against an element defining the bore or against the journal in the second configuration of the immobilization device.

3. The valve as claimed in claim 2, wherein the cam surface of the ring is frustoconical and the surface of the sleeve radially facing the ring is frustoconical and inclined in a manner complementary to the frustoconical surface of the ring.

4. The valve as claimed in claim 2, wherein the immobilization device includes two elastically deformable sleeves respectively disposed radially inside and outside the actuator ring.

5. The valve as claimed in claim 4, wherein the actuator ring is movable axially along an axis parallel to the rotation axis of the journal and pushes each sleeve radially against the element defining the bore and against the journal, respectively, when the immobilization device goes from its first configuration to its second configuration.

6. The valve as claimed in claim 2, wherein the actuator ring is moved by means of a screw-nut system, the ring including screwthreads for receiving threaded members rotation of which is commanded via the lining, the screwthreads and the threaded members being distributed around the rotation axis of the journal.

7. The valve as claimed in claim 2, wherein the valve further includes a sealing mechanism including a joint-support disposed on the same side of the actuator ring and the sleeves as the internal volume of the hollow body and that supports a seal and in that the seal-support is movable axially along an axis parallel to the rotation axis of the journal from an open first position in which the fluid can flow inside the immobilization device to a closed second position in which the seal abuts against the shoulder of the journal, sealing the immobilization device, and in that, conversely, the seal-support is movable from the second position to the first.

8. The valve as claimed in claim 7, wherein the seal-support is moved by means of a plurality of clamping screws that are axially fastened to the seal-support.

9. The valve as claimed in claim 1, wherein the valve includes an indicator disposed externally of the valve and enabling indication of the immobilization device being in its first configuration.

10. The valve as claimed in claim 1, wherein the body of the valve is equipped with passages and at least one needle valve enabling balancing of the pressure of the fluid on either side of the immobilization device.

11. The valve as claimed in claim 1, wherein in the first configuration of the immobilization device, a radial clearance between the or each extensible sleeve and the journal or the element defining the bore, respectively, is strictly greater than the radial clearance of the bearing and is less than one millimeter.

12. The valve as claimed in claim 1, wherein the immobilization device is maneuverable to go from its first configuration to its second configuration and vice versa by at least one maneuvering member that passes axially through a lining that is part of the bearing.

13. The valve as claimed in claim 12, wherein the maneuvering member is permanently mounted on the valve.

14. The valve as claimed in claim 12, wherein the maneuvering member is a rod that is inserted when necessary into an axial bore of a lining of the bearing immobilized in the bore.

15. A fluid distribution network, comprising at least one valve as claimed in claim 1 installed on a pipe.

16. An installation for converting hydraulic energy into electrical or mechanical energy or vice versa, the installation comprising a fluid distribution network as claimed in claim 15 in which the pipe is a feed pipe of a hydraulic machine that is part of the installation.

17. A method for partial dismounting of a valve as claimed in claim 1, this method including:
   a)—placing a blocking member on a downstream part of the hollow body,
   b)—balancing the water pressure on either side of the blocking member,
   c)—maneuvering the immobilization device so that it goes from its first configuration to its second, and
   d)—removing the bearing.

18. The method as claimed in claim 17, wherein the valve is as claimed in claim 7 and in that the method further includes a step e) after the step b) and before the step c), consisting in purging the fluid inside the immobilization device.

19. The method as claimed in claim 17, wherein the valve is as claimed in claim 7 and in that the method further includes f) after the step c) and before the step d), consisting in maneuvering the sealing mechanism so that it goes from its first position to its second.

* * * * *